United States Patent
Heck et al.

(10) Patent No.: US 9,991,770 B2
(45) Date of Patent: Jun. 5, 2018

(54) SPRING POST FOR BRUSH CARD FOR A POWER TOOL

(71) Applicant: Black & Decker Inc., New Britain, CT (US)

(72) Inventors: Daniel F. Heck, Baltimore, MD (US); Stephen P. Osborne, Pikesville, MD (US); Jarrett A. Dunston, Owings Mills, MD (US)

(73) Assignee: Black & Decker Inc., New Britain, CT (US)

( * ) Notice: Subject to any disclaimer, the term of this patent is extended or adjusted under 35 U.S.C. 154(b) by 229 days.

(21) Appl. No.: 14/935,560

(22) Filed: Nov. 9, 2015

(65) Prior Publication Data
US 2016/0065039 A1 Mar. 3, 2016

Related U.S. Application Data

(63) Continuation-in-part of application No. 14/453,706, filed on Aug. 7, 2014, and a continuation-in-part of application No. 14/608,917, filed on Jan. 29, 2015.
(Continued)

(51) Int. Cl.
*H02K 13/00* (2006.01)
*H02K 13/10* (2006.01)
(Continued)

(52) U.S. Cl.
CPC ......... *H02K 13/10* (2013.01); *H01R 39/381* (2013.01); *H01R 39/385* (2013.01); *H02K 3/527* (2013.01);
(Continued)

(58) Field of Classification Search
CPC ........ H02K 13/10; H02K 3/527; H02K 5/148; H02K 5/1672; H02K 9/06; H02K 5/18; H02K 7/145; H02K 9/28
(Continued)

(56) References Cited

U.S. PATENT DOCUMENTS 1,686,324 A 10/1928 Hillix
1,858,870 A 5/1932 Apple
(Continued)

FOREIGN PATENT DOCUMENTS

DE 19522329 1/1997
EP 1621293 2/2006
(Continued)

OTHER PUBLICATIONS

EP search report dated Jan. 7, 2016 for EP Application No. 14180418.7.
(Continued)

*Primary Examiner* — Thanh Lam
(74) *Attorney, Agent, or Firm* — Amir R. Rohani

(57) ABSTRACT

An electric motor is provided including a stator and an armature rotatably received within the stator, the armature having an armature shaft on which a commutator is mounted. The motor also includes a brush assembly having a brush card mount disposed around the commutator, a brush holder mounted on a surface of the brush card mount, and a brush disposed within the brush holder in sliding contact with the commutator to supply electric current to the commutator. A torsion spring is secured to the brush card mount adjacent the brush holder, the spring having a leg arranged to engage the back surface of the brush. A spring stop post is disposed proximate an outer periphery of the brush card mount to limit an outward movement of the leg of the spring away from the back surface of the brush.

14 Claims, 7 Drawing Sheets

Related U.S. Application Data

(60) Provisional application No. 62/076,940, filed on Nov. 7, 2014, provisional application No. 61/932,932, filed on Jan. 29, 2014, provisional application No. 61/864,264, filed on Aug. 9, 2013.

(51) Int. Cl.

| | |
|---|---|
| *H01R 39/38* | (2006.01) |
| *H02K 3/52* | (2006.01) |
| *H02K 5/14* | (2006.01) |
| *H02K 9/06* | (2006.01) |
| *H02K 5/167* | (2006.01) |
| *H02K 7/14* | (2006.01) |
| *H02K 5/18* | (2006.01) |
| *H02K 9/28* | (2006.01) |

(52) U.S. Cl.
CPC ............ *H02K 5/148* (2013.01); *H02K 5/1672* (2013.01); *H02K 9/06* (2013.01); *H02K 5/18* (2013.01); *H02K 7/145* (2013.01); *H02K 9/28* (2013.01)

(58) Field of Classification Search
USPC .................................. 310/239, 50, 246–247
See application file for complete search history.

(56) References Cited

U.S. PATENT DOCUMENTS

| | | | |
|---|---|---|---|
| 2,406,389 A | 11/1942 | Lee | |
| 3,447,001 A | 5/1969 | Zelik | |
| 3,525,891 A | 8/1970 | Lukawich et al. | |
| 3,652,879 A | 3/1972 | Plunkett et al. | |
| 3,875,436 A | 4/1975 | MacFarland | |
| 4,074,162 A | 2/1978 | Parzych | |
| 4,115,030 A | 9/1978 | Inagaki et al. | |
| 4,184,804 A | 1/1980 | Inagaki et al. | |
| 4,276,737 A | 7/1981 | Henning | |
| 4,322,647 A | 3/1982 | Neroda et al. | |
| 4,342,929 A | 8/1982 | Horne | |
| 4,403,910 A | 9/1983 | Watanabe et al. | |
| 4,491,752 A | 1/1985 | O'Hara et al. | |
| 4,498,230 A | 2/1985 | Harris et al. | |
| 4,504,754 A | 3/1985 | Stone | |
| 4,538,085 A | 8/1985 | Tanaka | |
| 4,593,220 A | 6/1986 | Cousins et al. | |
| 4,684,774 A | 8/1987 | Dibbnern, Jr. et al. | |
| 4,694,214 A | 9/1987 | Stewart et al. | |
| 4,734,604 A | 3/1988 | Sontheimer et al. | |
| 4,851,730 A | 7/1989 | Fushiya et al. | |
| 5,021,696 A | 6/1991 | Nelson | |
| 5,049,770 A | 9/1991 | Gaeth et al. | |
| 5,055,728 A | 10/1991 | Looper et al. | |
| 5,089,735 A | 2/1992 | Sawaguchi et al. | |
| 5,264,749 A | 11/1993 | Maeda et al. | |
| 5,414,317 A | 5/1995 | Reid et al. | |
| 5,602,957 A | 2/1997 | Wille et al. | |
| 5,689,148 A | 11/1997 | Bubinchik | |
| 5,714,810 A | 2/1998 | Yuhi et al. | |
| 5,717,271 A | 2/1998 | Aoki et al. | |
| 5,729,064 A | 3/1998 | Noguchi et al. | |
| 5,773,907 A | 6/1998 | Bubinchik | |
| 5,810,111 A | 9/1998 | Takeuchi et al. | |
| 5,818,142 A | 10/1998 | Edlebulte et al. | |
| 5,872,414 A | 2/1999 | Iijima | |
| 5,932,945 A | 8/1999 | Volz et al. | |
| 5,949,175 A | 9/1999 | Cummins | |
| 5,969,450 A | 10/1999 | Satterfield et al. | |
| 5,977,672 A | 11/1999 | Vacca | |
| 6,005,323 A | 12/1999 | Morimoto et al. | |
| 6,020,661 A | 2/2000 | Trago et al. | |
| 6,078,116 A | 6/2000 | Shiga et al. | |
| 6,087,758 A | 7/2000 | Hino et al. | |
| 6,124,567 A | 9/2000 | Feldhausen et al. | |
| 6,133,665 A | 10/2000 | Prell et al. | |
| 6,144,134 A | 11/2000 | Lin | |
| 6,166,474 A | 12/2000 | Kohara et al. | |
| 6,288,469 B1 | 9/2001 | Kimura et al. | |
| 6,445,097 B1 | 9/2002 | Zeiler et al. | |
| 6,518,686 B2 | 2/2003 | Campbell et al. | |
| 6,528,910 B2 | 3/2003 | Nakamura et al. | |
| 6,528,921 B1 | 3/2003 | Nakane | |
| 6,541,890 B2 | 4/2003 | Murata et al. | |
| 6,552,465 B2 | 4/2003 | Mademba-Sy | |
| 6,555,943 B2 | 4/2003 | Walther et al. | |
| 6,677,693 B2 | 1/2004 | Ooyama | |
| 6,701,604 B2 | 3/2004 | Zeiler et al. | |
| 6,703,754 B1 | 3/2004 | Finkenbinder et al. | |
| 6,707,177 B1 | 3/2004 | Campbell et al. | |
| 6,707,181 B1 | 3/2004 | Militello et al. | |
| 6,713,916 B1 | 3/2004 | Williams et al. | |
| 6,842,966 B1 | 1/2005 | Campbell et al. | |
| 6,870,296 B2 | 3/2005 | Ho et al. | |
| 6,880,231 B2 | 4/2005 | Campbell et al. | |
| 6,909,218 B2 | 6/2005 | Ortt et al. | |
| 6,922,003 B2 | 7/2005 | Uchida | |
| 6,927,512 B2 | 8/2005 | Zeiler et al. | |
| 6,977,452 B2 | 12/2005 | Ibach | |
| 7,064,462 B2 | 6/2006 | Hempe et al. | |
| 7,132,777 B2 | 11/2006 | Finkenbinder et al. | |
| 7,157,828 B2 | 1/2007 | Moroto et al. | |
| 7,166,939 B2 | 1/2007 | Voigt et al. | |
| 7,173,359 B2 | 2/2007 | Kong et al. | |
| 7,256,527 B2 | 8/2007 | Niimi | |
| 7,414,346 B1 | 8/2008 | Henmi et al. | |
| 7,459,819 B2 | 12/2008 | Finkenbinder et al. | |
| 7,466,056 B2 | 12/2008 | Golab et al. | |
| 7,495,367 B2 | 2/2009 | Braml et al. | |
| 7,521,826 B2 | 4/2009 | Hempe et al. | |
| 7,567,007 B2 | 7/2009 | Furui et al. | |
| 7,652,402 B2 | 1/2010 | Kinoshita et al. | |
| 7,683,519 B2 | 3/2010 | Finkenbinder et al. | |
| 7,777,380 B2 | 8/2010 | Rogelein | |
| 7,859,145 B2 | 12/2010 | Rapp et al. | |
| 7,944,112 B2 | 5/2011 | Kim et al. | |
| 7,952,241 B2 | 5/2011 | Kato et al. | |
| 7,977,835 B2 | 7/2011 | Simofi-Ilyes et al. | |
| 7,988,538 B2 | 8/2011 | Trautner et al. | |
| 8,049,380 B2 | 11/2011 | Li et al. | |
| 8,049,391 B2 | 11/2011 | Lau et al. | |
| 8,063,532 B2 | 11/2011 | Ahn | |
| 8,096,043 B2 | 1/2012 | Hargraves et al. | |
| 8,141,231 B2 | 3/2012 | Wolfe, Jr. et al. | |
| 8,154,169 B2 | 4/2012 | Qin et al. | |
| 8,294,328 B2 | 10/2012 | Lau et al. | |
| 8,723,389 B2 | 5/2014 | Shim et al. | |
| 9,083,131 B2 * | 7/2015 | Shima .................. | H01R 39/381 |
| 9,722,470 B2 | 8/2017 | Honda et al. | |
| 2003/0111929 A1 | 6/2003 | Hong et al. | |
| 2003/0111930 A1 | 6/2003 | Vacheron et al. | |
| 2004/0000835 A1 | 1/2004 | Fujita et al. | |
| 2004/0027028 A1 | 2/2004 | Ho et al. | |
| 2004/0171299 A1 | 9/2004 | Zeiler et al. | |
| 2004/0245886 A1 | 12/2004 | Uchida | |
| 2005/0134126 A1 | 6/2005 | Ibach | |
| 2005/0196273 A1 | 9/2005 | Nishikawa et al. | |
| 2006/0028088 A1 | 2/2006 | McFarland et al. | |
| 2006/0290213 A1 | 12/2006 | Furui et al. | |
| 2007/0007846 A1 * | 1/2007 | Niimi .................. | H01R 39/385 |
| | | | 310/239 |
| 2007/0126311 A1 | 6/2007 | Acosta | |
| 2007/0241631 A1 | 10/2007 | Lamprecht | |
| 2008/0084133 A1 | 4/2008 | Burton et al. | |
| 2009/0115266 A1 | 5/2009 | Hartfield et al. | |
| 2009/0121579 A1 | 5/2009 | Finkenbinder et al. | |
| 2009/0322166 A1 | 12/2009 | Satterfield et al. | |
| 2010/0045136 A1 | 2/2010 | Lau et al. | |
| 2011/0200466 A1 | 8/2011 | VanBriston et al. | |
| 2013/0049523 A1 | 2/2013 | Shima et al. | |

(56) References Cited

U.S. PATENT DOCUMENTS

FOREIGN PATENT DOCUMENTS

| EP | 1763123 | 3/2007 |
|---|---|---|
| EP | 2197076 | 6/2010 |
| FR | 2932318 | 12/2009 |
| JP | S61106041 | 5/1986 |
| JP | S6441689 | 3/1989 |
| JP | H09261914 | 10/1997 |
| JP | H1056761 | 2/1998 |
| JP | 2004249425 | 9/2004 |
| JP | 2008172943 | 7/2008 |
| JP | 2009284638 | 12/2009 |

OTHER PUBLICATIONS

EP search report dated Jan. 7, 2016 for EP Application No. 14180371.8.
EP search report dated Jan. 7, 2016 for EP Application No. 14180413.8.
EP search report dated Nov. 16, 2015 for EP Application No. 14180375.9.
EP search report dated Jan. 7, 2016 for EP Application No. 14180417.9.
EP search report dated Apr. 4, 2016 for EP Application No. 14180385.8.
EP search report dated Jan. 7, 2016 for EP Application No. 15193679.6.
EP Office Action dated Oct. 27, 2017 issued in corresponding EP patent application No. 14180417.9.
Non Final Office Action dated Jul. 27, 2017 issued in corresponding U.S. Appl. No. 14/453,706.
EP Office Action dated Oct. 27, 2017 issued in corresponding EP patent application No. 14180413.8.
Non Final Office Action dated Aug. 17, 2017 issued in corresponding U.S. Appl. No. 14/453,766.
ip.com search Aug. 16, 2017.
Non Final Office Action dated Aug. 25, 2017 issued in corresponding U.S. Appl. No. 14/453,755.
EP Office Action dated Aug. 17, 2017 issued in corresponding EP patent application No. 14180371.8.
Non Final Office Action dated Jun. 19, 2017 issued in corresponding U.S. Appl. No. 14/453,785.
Non Final Office Action dated May 4, 2017 issued in corresponding U.S. Appl. No. 14/453,793.
Notice of Allowance dated Sep. 6, 2017 issued in corresponding U.S. Appl. No. 14/608,917.
Non Final Office Action dated May 17, 2017 issued in corresponding U.S. Appl. No. 14/608,917.
Non Final Office Action dated May 5, 2017 issued in corresponding U.S. Appl. No. 14/453,873.
Non Final Office Action dated Sep. 6, 2017 issued in corresponding U.S. Appl. No. 14/935,560.
Non Final Office Action dated Apr. 18, 2017 issued in corresponding U.S. Appl. No. 14/453,863.
EP Office Action dated Aug. 31, 2017 issued in corresponding EP Application No. 14 180 418.7.
EP Office Action dated Mar. 6, 2018 issued in corresponding EP Application No. 15193679.6.

* cited by examiner

SPRING POST FOR BRUSH CARD FOR A POWER TOOL

CROSS-REFERENCE TO RELATED APPLICATIONS

This utility application claims the benefit of U.S. Provisional Application No. 62/076,940 filed Nov. 7, 2014, content of which is incorporated herein by reference in its entirety. This application is also a continuation-in-part (CIP) of U.S. application Ser. No. 14/453,706, filed Aug. 7, 2014, and U.S. application Ser. No. 14/608,917 filed Jan. 29, 2015, contents of both of which are incorporated herein by reference in their entireties.

FIELD OF THE DISCLOSURE

The present disclosure relates to a brush assembly for electric motors, and more particularly to a brush assembly for motors used in electric power tools.

BACKGROUND

The statements in this section merely provide background information related to the present disclosure and may not constitute prior art.

Known portable power tools typically have an electric motor received within a tool housing. One common type of electric motor used in power tools has a rotor, a stator, and brushes. The rotor includes a rotor shaft, laminations mounted on the rotor shaft, armature windings wound in slots in the lamination stack, and a commutator mounted on the rotor shaft and electrically connected to the armature windings. The stator may have field windings wound in laminations, or may have permanent magnets. The brushes are mounted in brush housings, often known as brush boxes or brush holders, in sliding electrical contact with the commutator. Electric current is supplied from a power source through the brushes to the commutator, and from the commutator to the armature windings.

The brushes and brush holders are typically part of a brush assembly(ies). The brush holders and brushes are disposed diametrically opposite to each other with the commutator disposed therebetween. The brush assembly(ies) includes springs that urge the brushes against the commutator. Exemplary brush assemblies may utilize two or four brushes around the commutator.

Power tool are often used in harsh work environments and are susceptible to user drop and other impact. It is important to protect the internal components of the power tool, including the power tool motor, against damage in the event of drops.

SUMMARY

According to an embodiment of the invention, an electric motor is provided including: a stator, an armature rotatably received within the stator, where the armature includes an armature shaft on which a commutator is mounted, and a brush assembly. According to an embodiment, the brush assembly includes a brush card mount disposed around the commutator; a brush holder mounted on a surface of the brush card mount; a brush disposed within the brush holder in sliding contact with the commutator to supply electric current to the commutator; a torsion spring secured to the brush card mount adjacent the brush holder, the spring having a leg arranged to engage a back surface of the brush; and a spring stop post disposed proximate an outer periphery of the brush card mount to limit an outward movement of the leg of the spring away from the back surface of the brush.

In an embodiment, the brush includes two curved surfaces with a groove formed therebetween. In an embodiment, a distal end of the leg of the spring engages the groove of the brush. In an embodiment, the distal end of the leg of the spring includes a hook engaging the groove of the brush.

In an embodiment, a spring post is provided projecting from the brush card mount, wherein the spring includes a wound portion secured around the spring post. In an embodiment, the spring stop post is circumferentially located between the spring post and the brush holder within an angle formed between the brush holder and the spring post relative to a center of the brush card mount.

In an embodiment, the spring stop post is provided substantially adjacent the leg of the spring and the spring stop post is engageable with a middle portion or distal end of the leg of the spring.

In an embodiment, the brush holder includes an opening that is open-ended on a distal end of the brush holder and extends radially to accommodate the back and forth movement of the spring.

In an embodiment, the brush assembly comprises four brush holders housing four brushes.

In an embodiment, the brush assembly includes a housing portion substantially cylindrically shaped and extending from the brush card mount, the housing portion being arranged to mate with an end or around an outer surface of the motor stator.

According to an embodiment, a power tool is provided including a housing and the electric motor described above.

DETAILED DESCRIPTION

Reference will now be made in detail to various aspects and embodiments of the invention, examples of which are illustrated in the accompanying drawings.

A four-pole brush card for a power tool is described in detail in patent application Ser. No. 14/453,706, filed Aug. 7, 2014, which is incorporated by reference herein in its entirety. The present disclosure is directed to an improvement of the four-pole brush card according to an embodiment.

Figure 1:
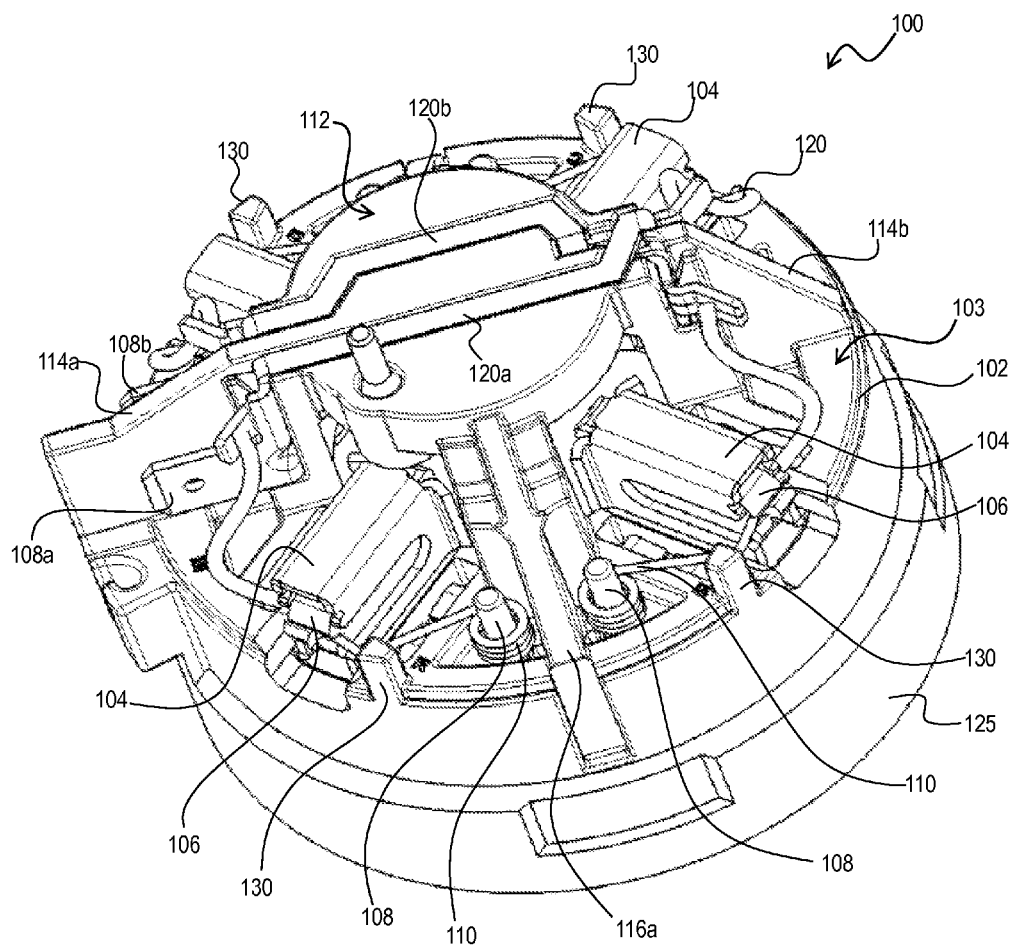
FIG. 1 depicts a perspective side view of a brush assembly (also referred to herein as brush card), according to an embodiment.
Figure 2:
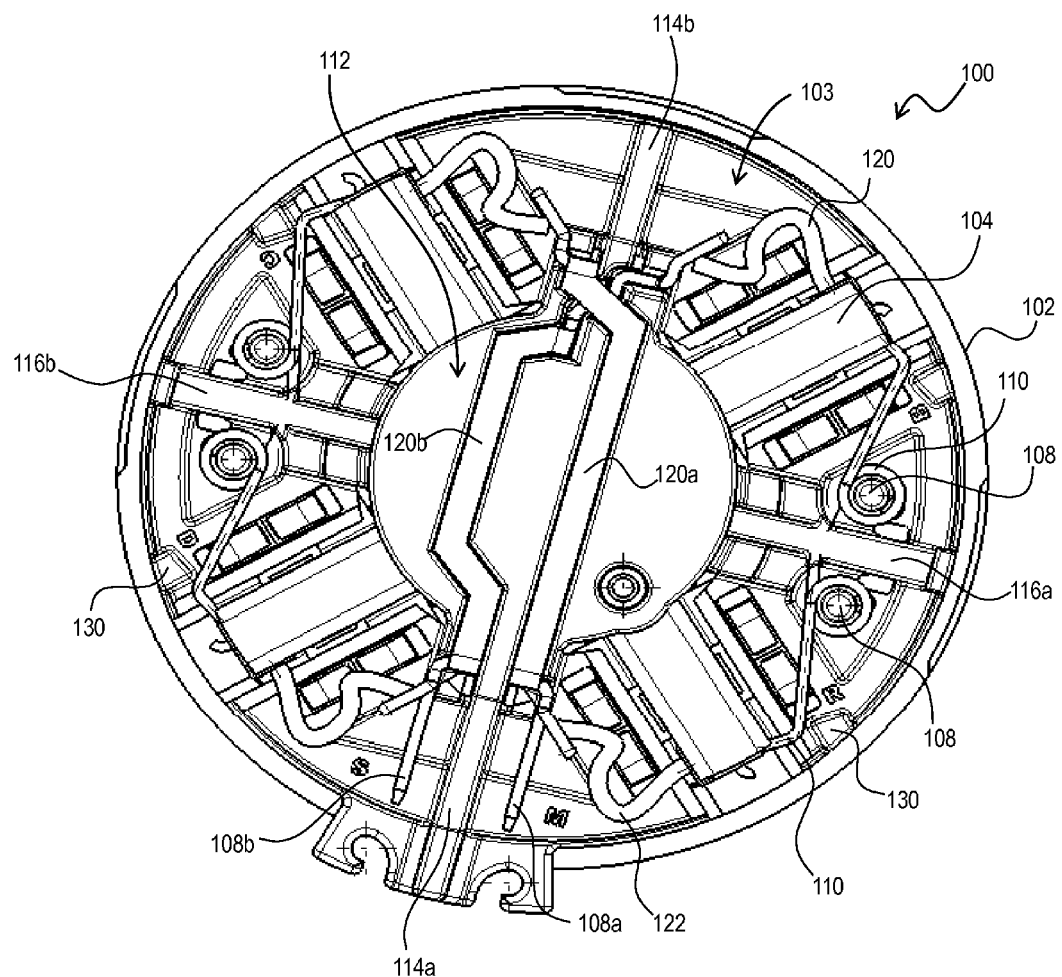
FIG. 2 depicts a top view of the brush card, according to an embodiment.

FIGS. 1 and 2 depict a brush assembly 100 (also referred to as brush card) according to an embodiment of the invention. In this embodiment, like the embodiments disclosed in patent application Ser. No. 14/453,706, the brush assembly 100 includes a brush card mount 102 and four brush holders 104. The brush card mount 102 has a substantially circular circumference and the four brush holders 104 are arranged equidistantly on four sides of the brush card mount 102. Each brush holder 104 accommodates a brush 106 therein. The brushes 106 housed in brush holders 104 facing each other are electrically connected to one another, as discussed below. Both ends of each brush holder 104 are open to allow radial movement of the brush 106 towards and away from a center of the brush card 100. The brush card mount 102 includes upright posts 108 in close proximity to the brush holders 104. Each post 108 is arranged to hold a wound portion of a spring 110. Each spring 110 includes an extended arm that engages a back surface of brush 106 inside the brush holder 104 to bias the brush 106 towards the center of the brush card 100.

According to an embodiment, brush card mount 102 includes a planar portion 103, to which brush holders 104 are secured. A middle section of the planar portion 103 includes an opening that receives a motor commutator (not shown). The brush card mount 102 also includes a bridge portion 112 arranged above the commutator opening (and the commutator) and connected to the planar portion via four bridge legs 114a, 114b, 116a, and 116b. Bridge legs 114a, 114b, 116a, and 116b extend longitudinally (i.e., in the direction of the motor, at a substantially right angle with respect to the plane of the brush card mount 102) from the planar portion 103 to the bridge portion 112. Radially formed between bridge legs 114a, 114b, 116a, and 116b are gaps that allow for the radial movement of brushes 106.

In an embodiment, each brush holder 104 includes two radial openings on its outer (vertical) walls. One radial opening is disposed adjacent the spring post 108 to allow the spring 110 to radially bias the brush 106 toward the commutator. The other radial opening is to facilitate a wire connection to the brush.

According to an embodiment, bridge leg 114a and 114b form walls that extend radially from the bridge portion 112 to (or near) outer edges of the brush card mount 102. In an embodiment, the bridge legs 116a and 116b similarly extend towards (or near) outer edges of the brush card mount 102. This arrangement strengthens support for the bridge portion 112. In addition, bridge leg 114a mechanically supports and electrically isolates two terminals 118a and 118b provided on both sides of its outward-extending wall. Terminals 118a and 118b are connected to metal routings 120a and 120b, which extend over the bridge portion 112 to bridge leg 114b. Metal routings 120a and 120b connect the brushes 106 facing each other to one of the terminals 118a and 118b. Specifically, ends of metal routings 120a and 120b are connected via wires 122 to either corresponding brush holders 104 or brushes 106. In an embodiment, metal routing 120a crosses over routing 120b to allow for opposite brushes 106/brush holders 104 to be connected to the same terminal 118a or 118b.

In an embodiment, the brush assembly also includes a housing portion 125 attached to the brush card mount 102. The housing portion 125 may be provided as a separate piece, on which the brush card mount 102 is mounted. Alternatively, the housing portion 125 may be provided integrally with the brush card mount 102 as a single molded piece. In an embodiment, housing portion is substantially cylindrical shaped, sized to mate with (or fit around) a motor stator. Alternatively the housing portion 125 comprises a housing (i.e., can) for the entire motor assembly.

Figure 3:
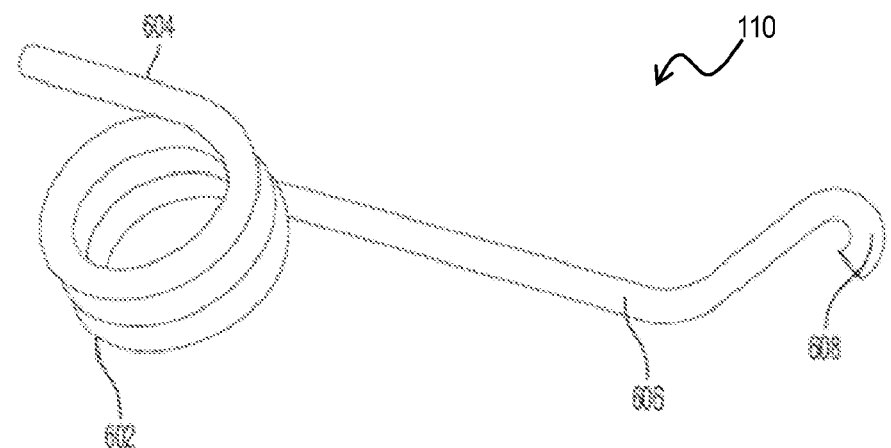
FIG. 3 depicts a perspective view of a spring of the brush card, according to an embodiment.

FIG. 3 depicts a spring 110, according to an embodiment. Spring 110 includes a wound portion 602, a first leg 604, and a second leg 606 that is longer than the first leg 604 and includes a hook 608 at its distal end.

Figure 4:
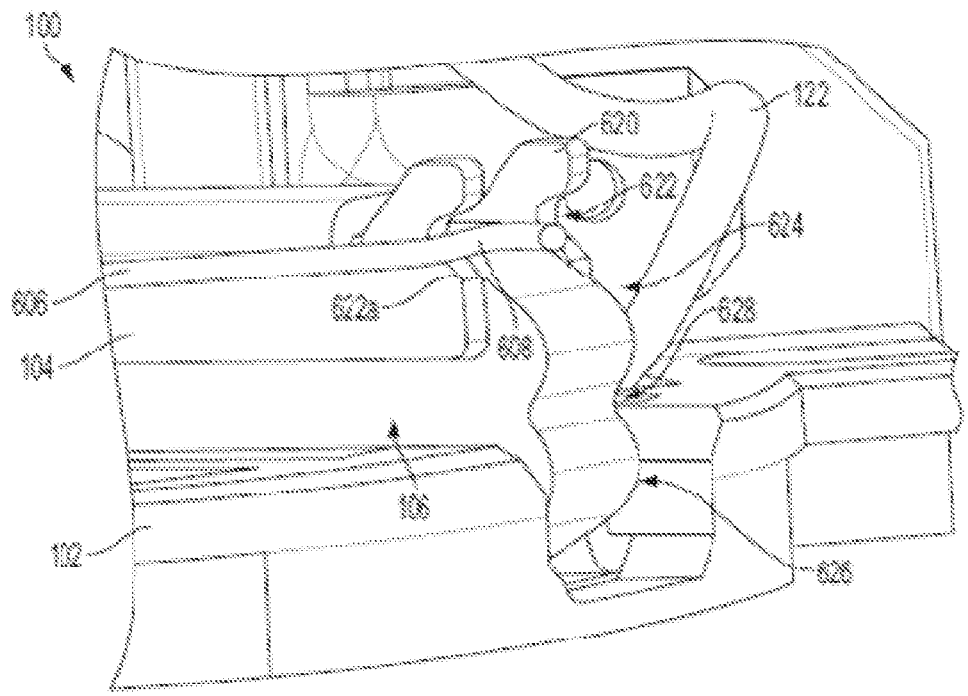
FIG. 4 depicts a perspective zoomed-in view of the brush and brush holder, according to an embodiment.

FIG. 4 depicts a perspective view of a brush 106 inside the brush holder 104. In an embodiment, hook 608 of the spring 110 engages a recess 622 of end portion 620 of the brush holder 104 during the assembly process. Once the motor is fully assembled and the commutator is placed inside the brush card 100, the hook 608 and the second leg 606 are pulled down to engage the rear surface of the brush 106.

In an embodiment, the rear surface of the brush 106 includes two humped surfaces 624 and 626 and a groove 628 therebetween. In an embodiment, the hook 608 is pulled down to engage the groove 628 to complete the assembly process. In this embodiment, each the humped surfaces 624 may be semi-circular shaped, although a cam surface may be utilized to optimize the movement of the hook 608 over the humped surface 624.

It was found that in power tool application incorporating the brush assembly 100 of the invention, the tip of the spring 110 would at times disengage the brush 106 during drop tests. This is largely due to the relatively heavy mass of the brush 106 overcoming the spring 104 force during impact. The In such circumstances, the spring may engage the brush or the brush holder at an incorrect position, or even dislocate out of position completely.

One obvious solution to this problem is to use springs with higher spring force. However this solution is not practical because the spring force should be optimized for effective motor commutation without damaging the brushes and prolonging the brush life.

Referring back to FIGS. 1 and 2, in order to solve this problem, according to an embodiment of the invention, a spring stop post 130 is provided in the vicinity of each brush holder 104 to limit the movement of the spring 110 away from the brush 106. In this embodiment, the stop post 130 is arranged near the outer periphery of the brush card mount 102. Alternatively, stop post 130 may project from the housing portion 125 through slots on the outer periphery of the brush card mount 120. The stop post 130 is circumferentially located between the spring post 108 and the brush holder 104 (i.e., within the angle formed between the brush holder 104 and the spring post 108 relative to the center of the brush assembly 100). In an embodiment, the stop post 130 is provided adjacent spring leg 606 (see FIG. 3) of spring 110 to limit an outward movement of spring leg 606. In an embodiment, the stop post 130 may come in contact with a middle portion or distal end of the leg 606 of the spring 110.

In an embodiment, the stop post 130 blocks the spring 110 from backing out of its proper position relative to the brush 106. In an embodiment, the stop post 130 limits the movement of the spring 110 too far out of brush groove 628. Specifically, the stop post 130 is positioned just close enough to the brush holder 104 and spring 110 to allow the spring 110 to be moved into its proper position within the brush groove 628 during motor assembly, but to also to limit movement of the spring 110 too far out of the brush groove 628 in the event of a drop. In an embodiment, leg 606 of the spring 110 makes contact with the stop post 130 if the leg 606 moves too far radially from the brush groove 628. It has been shown that during drop tests, the stop posts limits the radial movement of the spring 110 and forces the spring 110 to reengage the brush groove 628.

Figure 5:
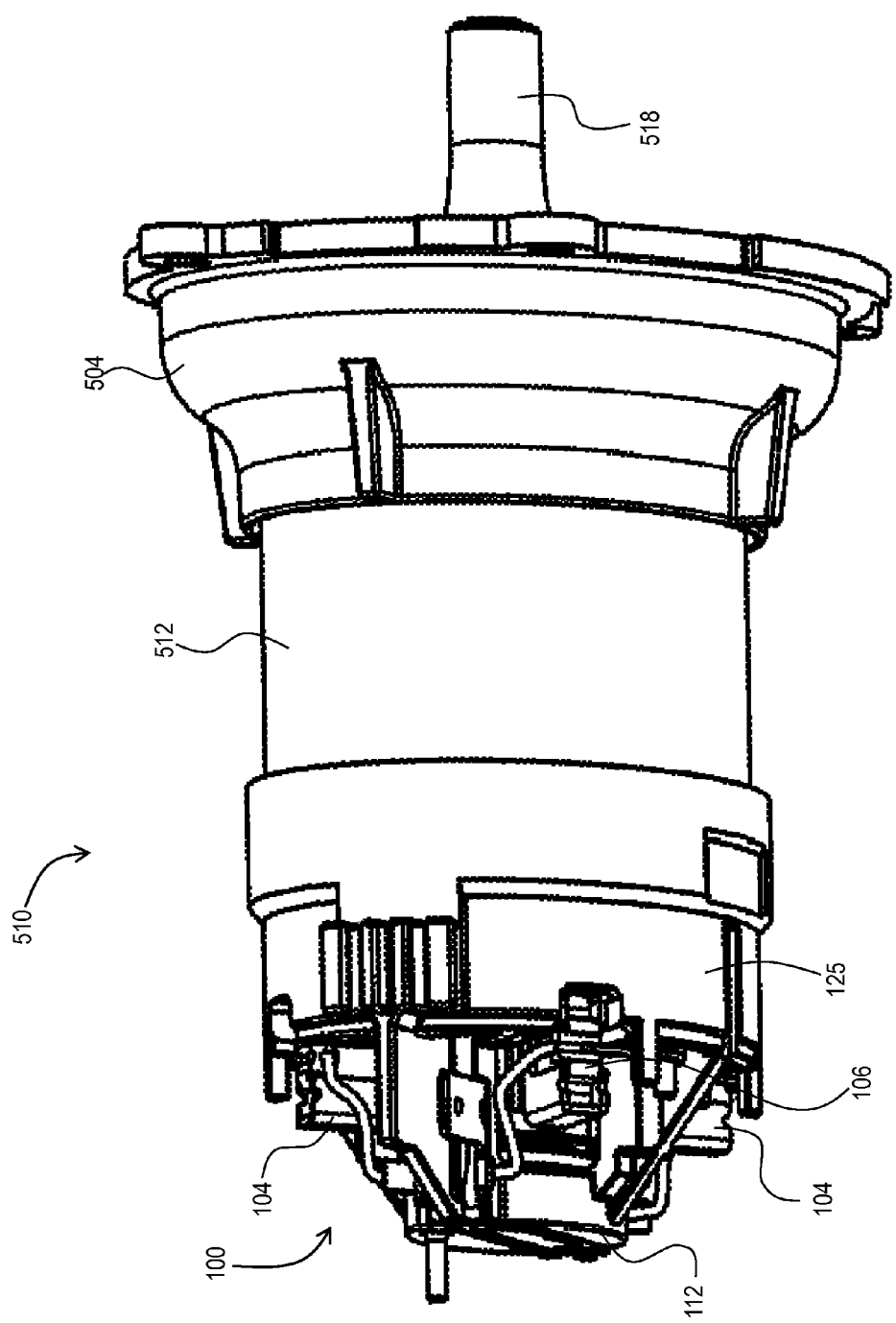
FIG. 5 depicts a side view of an electric motor including the brush card, according to an embodiment.
Figure 6:
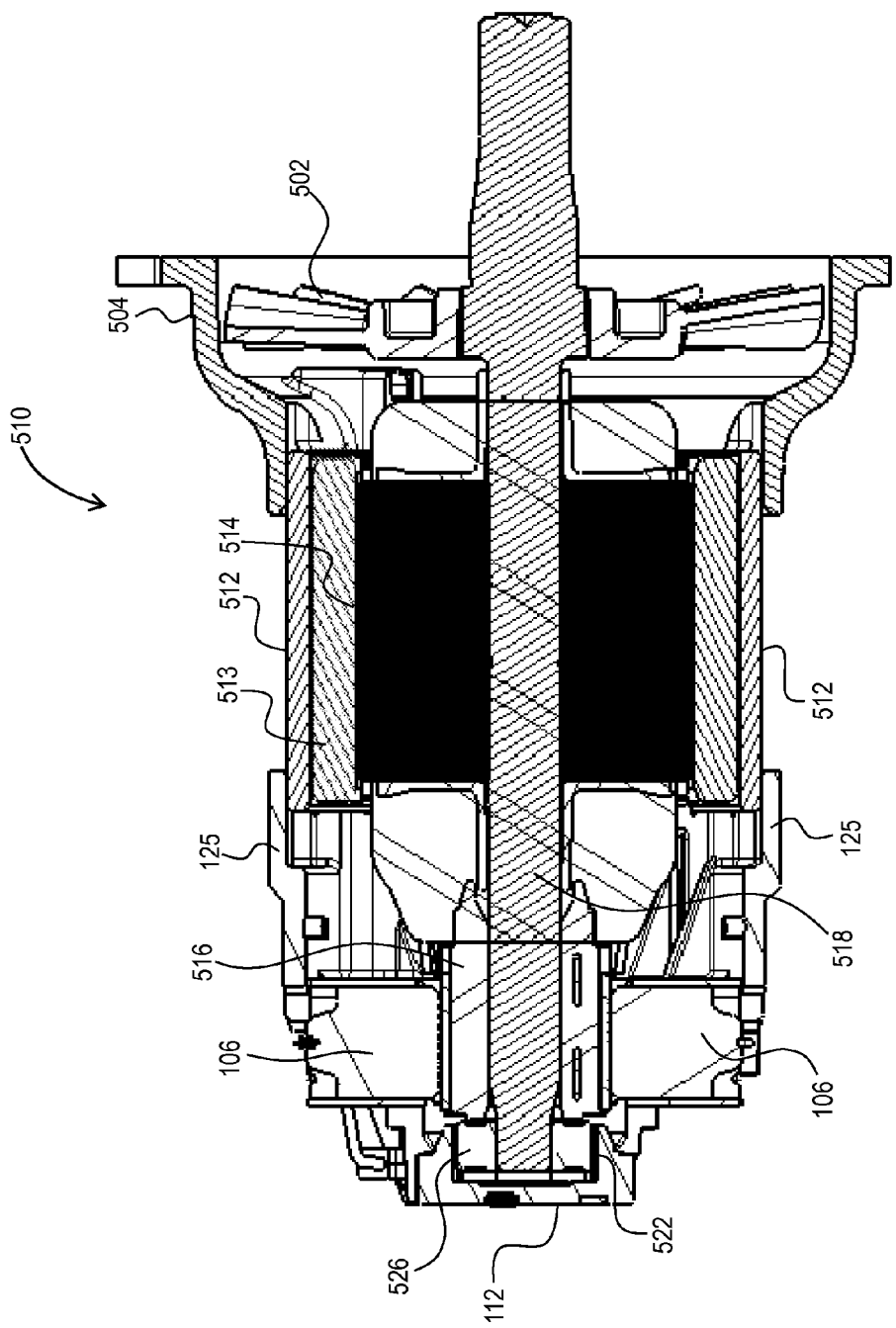
FIG. 6 depicts a cross-sectional view of the electric motor of FIG. 5, according to an embodiment.

FIG. 5 depicts a side view of an electric motor 510 including the brush assembly 100 described above, according to an embodiment. FIG. 6 depicts a cross-sectional view of the same motor 510. Motor 510, in an embodiment, includes a stator (or field can) 512 and an armature (or rotor) 514 disposed within the stator 512. The stator 512 may include, for example, a number of permanent magnets 513 affixed therein. An armature shaft 518 is secured to the rotor 514. A commutator 516 is mounted on the shaft 518 such that the armature 514, the commutator 516, and the shaft 528 are all rotatably coupled. A fan 502 is also mounted to another end of the shaft 518 and housed by a cup 504.

In an embodiment, brush assembly 100 is mounted on an end of the stator 512 such that the housing portion 125 partially covers an outer surface of the stator 512. Alternatively, the housing portion 125 may mate with an end of the stator 512 via, for example, screws or other fastening means. The brush holders 104 are in this manner arranged around the commutator 516, allowing the brushes 106 to make contact with the commutator 516. An end bearing 520 of the shaft 518 is housed within a bearing pocket 522 on an underside of the bridge portion 512 of the brush assembly 100.

Figure 7:
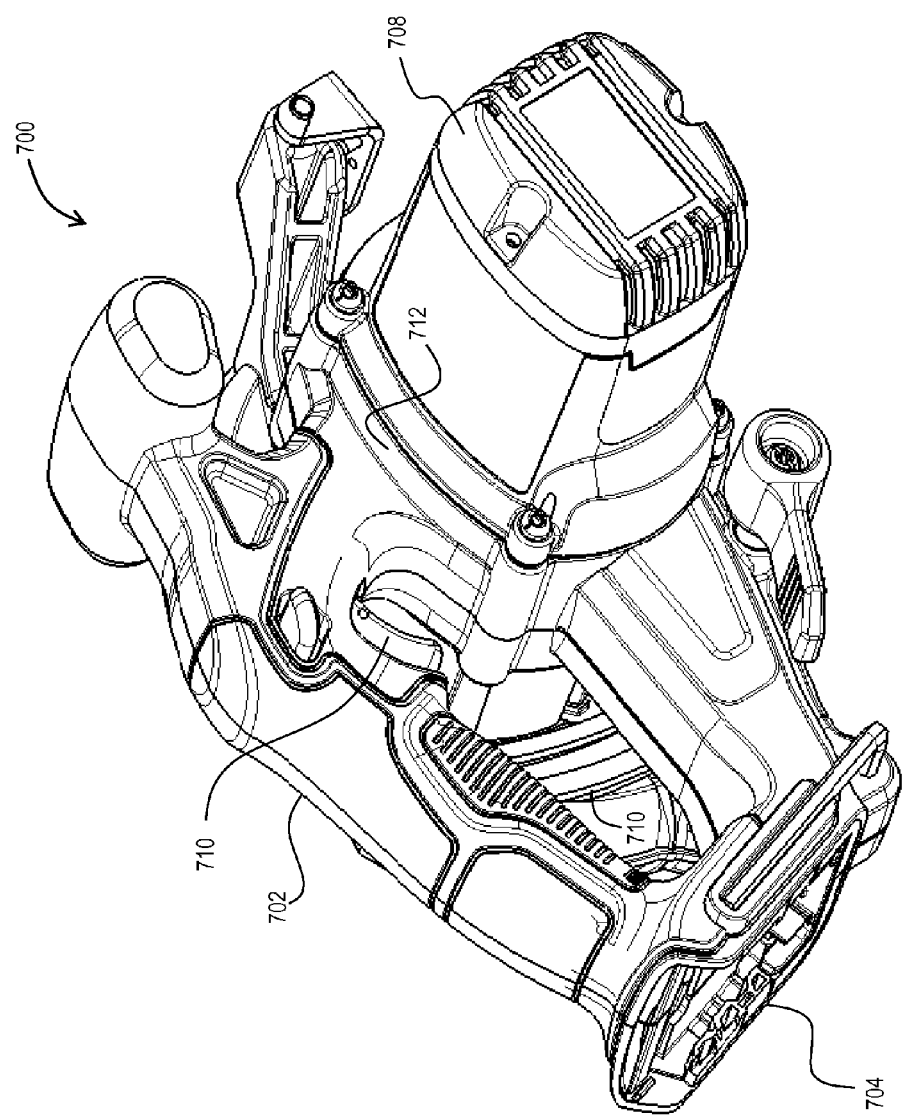
FIG. 7 depicts a perspective view of a power tool having the electric motor, according to an embodiment.
Figure 8:
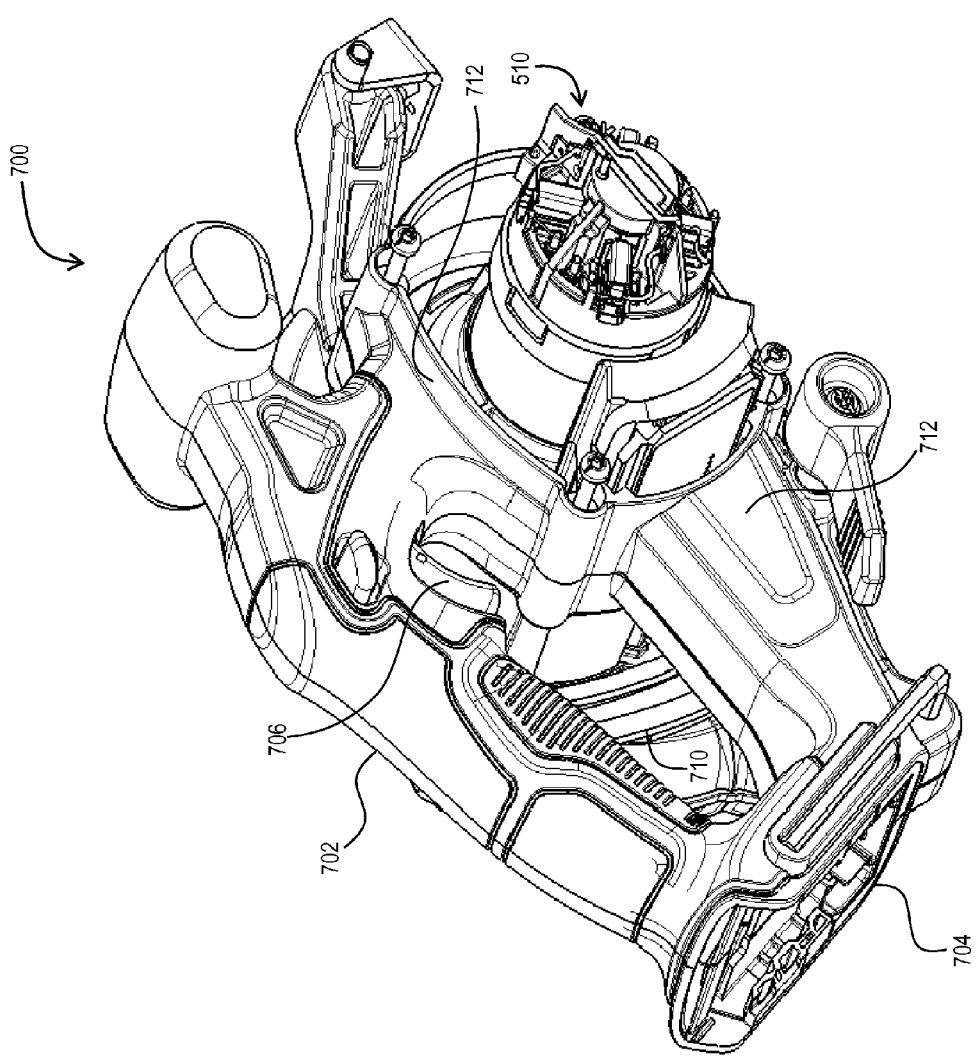
FIG. 8 depicts the power tool of FIG. 7 with a motor cover removed, according to an embodiment.

FIG. 7 depicts a perspective view of a power tool 700 including the motor 510 described above, according to an embodiment. Power tool 700 in this example is a circular saw, though it should be understood that the circular saw is illustrated herein by way of example and the motor 510 of the invention with the brush assembly 100 described above may be utilized in any power tool, including, but not limited to, drills, impact drivers, miter saws, chop saws, grinders, hammer drills, cutters, nailers, etc. In an embodiment, power tool 700 may be a DC (direct current) handheld electric tool having a housing 712 with a handle portion 702 accommodating a trigger switch 706 and a battery receiving portion 704. It must be understood, however, that the power tool 700 may alternatively be an AC (alternating current) power tool powered via an AC cord, or an AC/DC power tool. Power tool 700 further includes a motor cover 708 and a saw abrasive guard 710. Motor 510 is rotatable coupled to a saw disc housed within the guard 710. FIG. 8 depicts the same view of power tool 700, with the motor cover 708 removed for illustration purposes.

The description of the invention is merely exemplary in nature and, thus, variations that do not depart from the gist of the invention are intended to be within the scope of the invention. Such variations are not to be regarded as a departure from the scope of the invention. It is noted that while the exemplary embodiment herein is described with reference to a four-pole brush assembly, the stop post of the present disclosure may be utilized with any brush assembly such as a two-pole brush assembly. Furthermore, it is noted that while the exemplary embodiment herein is described with reference to a two-piece brush holder, any type of brush holder such may be used in combination with the stop post.

The invention claimed is:

1. An electric motor comprising:
   a stator;
   an armature rotatably received within the stator, the armature having an armature shaft on which a commutator is mounted; and
   a brush assembly comprising:
      a brush card mount disposed around the commutator;
      a brush holder mounted on a surface of the brush card mount;
      a brush disposed within the brush holder in sliding contact with the commutator to supply electric current to the commutator;
      a spring post projecting from the brush card mount adjacent the brush holder;
      a torsion spring having a wound portion secured around the spring post and a leg extending from the wound portion and arranged to engage a back surface of the brush; and
      a spring stop disposed proximate an outer periphery of the brush card mount at a distance from the spring post to limit an outward movement of the leg of the spring away from the back surface of the brush.

2. The electric motor of claim 1, wherein the brush includes two curved surfaces with a groove formed therebetween.

3. The electric motor of claim 2, wherein a distal end of the leg of the spring engages the groove of the brush.

4. The electric motor of claim 3, wherein the distal end of the leg of the spring comprises a hook engaging the groove of the brush.

5. The electric motor of claim 1, wherein the spring stop is angularly located between the spring post and the brush holder relative to a center of the brush card mount.

6. The electric motor of claim 1, wherein the spring stop is provided substantially adjacent the leg of the spring and the spring stop is engageable with a middle portion or distal end of the leg of the spring.

7. The electric motor of claim 1, wherein the brush holder includes an opening that is open-ended on a distal end of the brush holder and extends radially to accommodate the back and forth movement of the spring.

8. The electric motor of claim 1, wherein the brush assembly comprises four brush holders housing four brushes.

9. The electric motor of claim 1, further comprising a housing portion substantially cylindrically shaped and extending from the brush card mount, the housing portion being arranged to mate with an end or around an outer surface of the motor stator.

10. A power tool comprising:
    a housing; and
    an electric motor disposed within the housing, the motor including: a stator; an armature rotatably received within the stator, the armature having an armature shaft on which a commutator is mounted; and a brush assembly,
    wherein the brush assembly comprises:
       a brush card mount disposed around the commutator;
       a brush holder mounted on a surface of the brush card mount;
       a brush disposed within the brush holder in sliding contact with the commutator to supply electric current to the commutator;
       a spring post disposed adjacent the brush holder;
       a torsion spring having a wound portion secured around the spring post and a leg extending from the wound portion and arranged to engage a back surface of the brush; and
       a spring stop disposed proximate an outer periphery of the brush card mount at a distance from the spring post to limit an outward movement of the leg of the spring away from the back surface of the brush.

11. The power tool of claim 10, wherein the brush includes two curved surfaces with a groove formed therebetween.

12. The power tool of claim 11, wherein a distal end of the leg of the spring engages the groove of the brush.

13. The power tool of claim 1, wherein the spring stop is angularly located between the spring post and the brush holder relative to a center of the brush card mount.

14. The power tool of claim 10, the brush assembly further comprising a housing portion substantially cylindrically shaped and extending from the brush card mount, the housing portion being arranged to mate with an end or around an outer surface of the motor stator.

* * * * *